(12) United States Patent
Guo et al.

(10) Patent No.: US 11,228,082 B2
(45) Date of Patent: Jan. 18, 2022

(54) WIRELESS COMMUNICATION ANTENNA STRUCTURE FOR BOTH HEAT DISSIPATION AND RADIATION

(71) Applicant: SHENZHEN ACCOMTECH COMMUNICATION ELECTRONICS CO., LTD., Shenzhen (CN)

(72) Inventors: Tienan Guo, Guangdong (CN); Tielong Guo, Guangdong (CN); Guanglin Xu, Guangdong (CN); Yonggang Tan, Guangdong (CN)

(73) Assignee: SHENZHEN ACCOMTECH COMMUNICATION ELECTRONICS CO., LTD., Shenzhen (CN)

( * ) Notice: Subject to any disclaimer, the term of this patent is extended or adjusted under 35 U.S.C. 154(b) by 157 days.

(21) Appl. No.: 16/632,791

(22) PCT Filed: Apr. 19, 2019

(86) PCT No.: PCT/CN2019/083489
§ 371 (c)(1),
(2) Date: Jan. 21, 2020

(87) PCT Pub. No.: WO2020/034657
PCT Pub. Date: Feb. 20, 2020

(65) Prior Publication Data
US 2021/0226312 A1    Jul. 22, 2021

(30) Foreign Application Priority Data
Aug. 17, 2018 (CN) .......................... 201810942523.6

(51) Int. Cl.
*H01Q 1/38* (2006.01)
*H01Q 1/02* (2006.01)
*H01Q 1/36* (2006.01)

(52) U.S. Cl.
CPC ............... *H01Q 1/02* (2013.01); *H01Q 1/362* (2013.01); *H01Q 1/38* (2013.01)

(58) Field of Classification Search
CPC ............ H01Q 1/02; H01Q 1/362; H01Q 1/38; H01Q 1/243; H01Q 1/2225; H04B 5/0081; H04B 5/0031; H04B 5/0087
See application file for complete search history.

(56) References Cited

U.S. PATENT DOCUMENTS

2021/0062321 A1* 3/2021 Guo ..................... C23C 14/14

FOREIGN PATENT DOCUMENTS

KR       20190033699 A  *  4/2019  ............... H01Q 1/38

* cited by examiner

*Primary Examiner* — David E Lotter
(74) *Attorney, Agent, or Firm* — Nelson Mullins Riley & Scarborough LLP; Kongsik Kim, Esq.

(57) ABSTRACT

The present disclosure provides a wireless communication antenna structure for both heat dissipation and radiation which includes: an inside helical pattern including an inside start end and an inside tail end; an outside helical pattern including an outside start end and an outside tail end; a heat dissipating/radiating metal layer including one side metal region and the other side metal region; and a plurality of via holes respectively connecting, up and down, the inside tail end and the one side metal region, and the outside start end and the other side metal region, so that the inside helical pattern, the heat dissipating/radiating metal layer and the outside helical pattern are connected in sequence to be a helical type. The present disclosure also implements heat dissipation of various components inside a portable terminal while implementing better near field wireless communication.

18 Claims, 20 Drawing Sheets

WIRELESS COMMUNICATION ANTENNA STRUCTURE FOR BOTH HEAT DISSIPATION AND RADIATION

CROSS-REFERENCES TO RELATED APPLICATIONS

This application is a U.S. national phase application, pursuant to 35 U.S.C. § 371, of PCT/CN2019/083489, filed Apr. 19, 2019, designating the United States, which claims priority to Chinese Application No. 201810942523.6, filed Aug. 17, 2018. The entire contents of the aforementioned patent applications are incorporated herein by this reference.

TECHNICAL FIELD

The present disclosure relates to a wireless communication antenna structure for both heat dissipation and radiation, and in particular, relates to a wireless communication antenna that reflects an inside helical pattern, a heat dissipating/radiating metal layer and an outside helical pattern connected in sequence in a helical type by using a metal layer at one side surface and a metal layer at the other side surface of a thin and soft flexible film. That is, a helical-type wireless communication antenna not only having the inside helical pattern and the outside helical pattern on the one surface of the flexible film, but also being wound by means of the additional number of turns of the heat dissipating/radiating metal layer on the one surface of the flexible film enables the heat dissipating/radiating metal layer to work as a radiating body. On this account, while enabling the performance of near field wireless communication to be further maximized, as a heat dissipating/radiating metal layer, it may also dissipate heat generated by various components in a portable terminal, also improve communication quality, and further implement a light, thin and short portable terminal.

BACKGROUND ART

Generally speaking, a tablet computer or a smart phone gets heated up because it is driven by multiple circuit components required in wireless communication or various calculations performed through power supply, and such kind of heat functions as a main factor for reducing service lives of components therebetween, thus, a structure that can dissipate heat as quickly as possible is needed.

FIG. 1 is a diagram showing an embodiment of antenna coils of a prior art (No. 2016-0121073, Published Patent Gazette of Republic of Korea).

The structure of wireless antenna coils used in smart phones in the prior art is as illustrated in FIG. 1. Two wireless data receiving coils 51-1 and 51-2 capable of wirelessly receiving data are provided on a housing portion, and a wireless energy receiving coil 52 capable of wirelessly receiving energy is provided inside the data receiving coils 51-1 and 51-2.

Meanwhile, in general, a maximum wireless data receiving coil 51-1 located at a outside may be an NFC coil, but according to needs, the wireless data receiving coil 51-1 located at the innermost may be an NFC coil.

FIGS. 2a-5b are diagrams showing embodiments of methods of configuring multi-antenna coils of the prior art.

FIGS. 2a-2d are diagrams showing embodiments of situations where the wireless energy receiving coil has wireless data receiving coils provided at an inside and outside thereof.

FIG. 2a is a diagram of an embodiment of a situation where there are also two wireless energy receiving coils 52-1 and 52-2 and there are also two wireless data receiving coils 51-1 and 51-2 provided at the outside of the wireless energy receiving coils 52-1 and 52-2.

FIGS. 2b and 2c are diagrams of an embodiment of a situation where there are also two wireless energy receiving coils 52-1 and 52-2, and there is one of the wireless data receiving coils 51-1 and 51-2 provided at the outside of the wireless energy receiving coils 52-1 and 52-2.

At this time, one of the wireless data receiving coils 51-1 and 51-2 may be an NFC coil, and may also be other data communication coils capable of performing authentications, settlements, or the like.

On the other hand, FIG. 2d is a diagram of an embodiment when there is one wireless energy receiving coil 52-1. Meanwhile, even if in the case where there is one wireless energy receiving coil 52-1, two wireless data receiving coils 51-1 and 51-2 may be provided at the outside of the wireless energy receiving coil 52-1.

On the other hand, when there is one wireless energy receiving coil 52-1, only one of the wireless data receiving coils 51-1 and 51-2 may be provided at the outside of the wireless energy receiving coil 52-1. At this time, the one of the wireless data receiving coils 51-1 and 51-2 may be an NFC coil, and may also be other data communication coils capable of performing authentications, settlements, or the like.

FIGS. 3a-3d are diagrams showing an embodiment of providing the wireless data receiving coils 51-1 and 51-2 independently of the wireless energy receiving coil 52. At this time, only one of the wireless data receiving coils 51-1 and 51-2 may exist. In addition, a size of the wireless data receiving coil 51-1 and a size of the wireless data receiving coil 51-2 may be less than and may also be similar to that of the wireless energy receiving coil 52.

FIGS. 4a and 4b are diagrams showing an embodiment of providing one of the wireless data receiving coils 51-1 and 51-2 at the outside of the wireless energy receiving coil 52, and providing the other one of the wireless data receiving coils 51-1 and 51-2 at another position.

At this time, a coil located at an outside of the wireless energy receiving coil 52 may be an NFC coil, and may also be other data communication coils capable of performing authentications, settlements or the like.

FIGS. 5a and 5b are diagrams showing embodiments of situations where the wireless data receiving coils 51-1 and 51-2 are configured independently of the wireless energy receiving coil 52, and there are two wireless data receiving coils 51-1 and 51-2.

Meanwhile, one of the two wireless data receiving coils 51-1 and 51-2 is provided at an inside, and the other one is provided at an outside. On the other hand, the wireless data receiving coil provided at the inside may be an NFC coil, and the wireless data receiving coil provided at the outside may be other data communication coils capable of performing authentications, settlements, or the like. Conversely, it may also be the case that the wireless data receiving coil provided at the outside is an NFC coil, and the wireless data receiving coil provided at the inside is other data communication coils capable of performing authentications, settlements, or the like.

FIG. 6 is a diagram showing an embodiment of other functional film layers provided on the wireless antenna coil.

As illustrated in FIG. 6, above a film 55 provided with wireless antenna coils 52 and 51, a film 56 formed with ferrite layers (magnetic layers) 56a and 56b is provided, and in addition, a film 57 formed with a heat dissipating film layer is provided thereon.

Meanwhile, a kind of the ferrite layer 56a where the wireless energy receiving coil is located and a kind of the ferrite layer 56b where the wireless data receiving coil is located may be different from each other.

A ferrite sheet may also have an insulating effect, but it is a component of a sheet form provided in order to minimize a magnetic field effect caused between coils and between coils and components. Thus, the ferrite sheet is enabled to be located between a coil and a mobile phone component.

Therefore, although in the case where a multi-antenna coil substrate 55 in the prior art is attached to a back of a housing of a smart phone, the ferrite sheet is located at a top; conversely, in the case where the multi-antenna coil substrate 55 is attached to components, such as a battery, and the like, of a smart phone, the ferrite sheet is attached to a bottom.

As a ferrite sheet, it adopts not only a silicon steel sheet, but may also be materials that have already been commercialized such as manganese, ferrite, permalloy, permendur, metallic glass, and iron powder. Moreover, it may use zinc, and the like as an absorber form.

A ferrite sheet is provided at a board region between coils so as to reduce impact of a magnetic field between the wireless energy receiving coils and the wireless data receiving coils.

FIGS. 7a and 7b are diagrams showing an embodiment of sectional structures of a ferrite film and a heat dissipating film.

In order to be provided in a smart phone, it is important to make thickness of respective layers become thinner, and the embodiment of FIG. 7 is a diagram showing an embodiment for making thickness of respective layers become thinner.

In FIGS. 7a and 7b, a heat dissipating layer is coated on a heat dissipating film 57 to form a heat dissipating layer 57a, and a thermal conductive adhesive layer 57b is formed under the heat dissipating film 57 in order to bond other layers. Meanwhile, the ferrite sheet forms ferrite layers 56 and 56b on the ferrite film 56. At this time, in order to make the entire thickness become thinner, the coating of the ferrite layer is about 20-100 μm. Moreover, a thermal conductive adhesive layer 56c is formed under the ferrite film 56.

However, the structure of a wireless antenna coil of the prior art used in smart phones is composed of a structure of coating heat dissipating layer on the heat dissipating film 57 to form the heat dissipating layer 57a and forming the conductive adhesive layer 57b under the heat dissipating film 57 in order to bond other layers, thus, it may bring the problem that the entire thickness become thicker due to the thickness of the heat dissipating film 57.

SUMMARY

In view of the defects existing in the prior art, the present disclosure provides the following solutions.

The present disclosure provides a wireless communication antenna structure for both heat dissipation and radiation including: an inside helical pattern having an inside start end and an inside tail end formed by performing helical-type patterning on a metal layer on one side surface of a flexible film; an outside helical pattern having an outside start end and an outside tail end formed by performing helical-type patterning on a metal layer on one side surface of the flexible film at an peripheral of the inside helical pattern; a heat dissipating/radiating metal layer having one side metal region and the other side metal region divided based on a one-way open slit formed by performing one-way open patterning on a metal layer on the other side surface of the flexible film; a plurality of via holes respectively connecting, up and down, the inside tail end and the one side metal region, and the outside start end and the other side metal region, so that the inside helical pattern, the heat dissipating/radiating metal layer and the outside helical pattern are connected in sequence to be a helical type.

Alternatively, the inside start end is used as a first terminal, and the outside tail end is used as a second terminal.

Alternatively, the first terminal includes: a first outward terminal formed by performing outward linear patterning on the metal layer on the one side surface of the flexible film; a via terminal formed by performing independent patterning on the heat dissipating/radiating metal layer on the other side surface of the flexible film; and a plurality of via holes respectively connecting, up and down, the inside start end and the via terminal, and the via terminal and the first outward terminal, so that the inside start end, the via terminal and the first outward terminal are connected in sequence.

Alternatively, it is completed by continuously connecting the second terminal to the second outward terminal formed by performing outward linear patterning on the metal layer on the one side surface of the flexible film.

Alternatively, the antenna structure further includes an expanded slot formed by expanding the metal layer on the other side surface of the flexible film, and connected with the one-way open slit.

Alternatively, the inside helical pattern and the outside helical pattern are formed on the one side surface of the flexible film in a manner of centering on the expanded slot of the other side surface of the flexible film and being arranged at an peripheral of the expanded slot.

Alternatively, the inside helical pattern and the outside helical pattern are formed on one side surface of the flexible film in a manner of being hung on the expanded slot of the other side surface of the flexible film.

Alternatively, the inside helical pattern and the outside helical pattern are formed on one side surface of the flexible film in a manner of being hung on the one-way open slit of the other side surface of the flexible film.

Alternatively, the wireless communication antenna structure for both heat dissipation and radiation includes: an other-way open slit formed on a metal layer inside the flexible film in a manner of being connected with the expanded slot; and a jump pattern formed on the metal layer on the one side surface of the flexible film and connected with the via holes up and down, so as to be capable of crossing the other-way open slit to connect the heat dissipating/radiating metal layer into an entirety.

Alternatively, the one-way open slit is formed on the metal layer on the other side surface of the flexible film in a manner of centering on the expanded slot and performing helical-type patterning on a peripheral of the expanded slot.

Alternatively, the antenna structure further includes a dummy heat dissipating layer for dissipating heat, and the dummy heat dissipating layer is formed by a metal layer remaining on the one side surface of the flexible film inside, outside and surrounding the inside helical pattern and the outside helical pattern.

Based on the above technical features, the effect of the present disclosure is as follows:

The present disclosure reflects a wireless communication antenna formed by an inside helical pattern, a heat dissipating/radiating metal layer and an outside helical pattern connected in sequence to be a helical type by patterning metal layers provided at two surfaces of a thin and soft flexible film, the effect of which may dissipate heat generated by various components inside a portable terminal as a radiating body while being capable of further maximizing the near field wireless communication performance.

In the present disclosure, an expanded slot or a one-way open slit is formed in the heat dissipating/radiating metal layer, and the wireless communication antenna may implement heat dissipating effect while maximizing a communication function.

The present disclosure reflects the wireless communication antenna in which an inside helical pattern, a heat dissipating/radiating metal layer and an outside helical pattern are connected in sequence to be a helical type by using a metal layer on one side surface and a metal layer on the other side surface of a thin and soft flexible film, that is, the helical-type wireless communication antenna not only having the inside helical pattern and the outside helical pattern of the surface of the flexible film, but also being wound by means of the additional number of turns of the heat dissipating/radiating metal layer on the other side surface of the flexible film, so that the heat dissipating/radiating metal layer may also further maximize the near field wireless communication performance while serving as a radiating body, and also as the heat dissipating/radiating metal layer, dissipate heat generated by various components inside the portable terminal, and may implement a light, thin and short portable terminal with high-quality communication and heat dissipation guarantee.

The further effects of the present disclosure are enabling the inside helical pattern and the outside helical pattern to be formed on one side surface of the flexible film in a manner of centering on the expanded slot of the other side surface of the flexible film and being arranged at an peripheraloutline of the expanded slot (most of paths of a magnetic field occurring due to currents of a near field transmitter are guaranteed through the expanded slot, so that a wireless communication antenna of a portable terminal is connected omni-directionally to form an induced current), enabling the inside helical pattern and the outside helical pattern to be formed on the one side surface of the flexible film in a manner of being hung on the expanded slot of the other side surface of the flexible film (through the expanded slot and the one-way open slit, it may guarantee paths of a magnetic field occurring due to currents of a near field transmitter, so that a wireless communication antenna of a portable terminal is connected omni-directionally to form an induced current), and enabling the inside helical pattern and the outside helical pattern to be formed on one side surface of the flexible film in a manner of being hung on the one-way open slit of the other side surface of the flexible film (through the expanded slot and the one-way open slit, it may guarantee paths of a magnetic field occurring due to currents of a near field transmitter, so that a wireless communication antenna of a portable terminal is connected omni-directionally to form an induced current).

In the present disclosure, the one-way open slit formed on the heat dissipating/radiating metal layer may be formed on the metal layer on the other side surface of the flexible film in a manner of centering on the expanded slot and performing helical-type patterning on the peripheral of the expanded slot. By such a helical type of the one-way open slit, it may further guarantee the overall number of turns of the wireless communication antenna, to further maximize the near field wireless communication performance.

The present disclosure further includes a dummy heat dissipating layer enabling a metal layer on the one side surface of the flexible film inside, outside and surrounding the inside helical pattern and the outside helical pattern to remain to facilitate heat dissipating, and the dummy heat dissipating layer dissipates heat generated by various components inside a portable terminal to further implement maximization of heat dissipation.

The present disclosure enables the metal layer on the one surface of the flexible film to remain and play a role as the dummy heat dissipating layer, and it has the effect of maximizing heat dissipation while guaranteeing lightness, thinness and shortness.

REFERENCE NUMERALS ARE EXPLAINED BELOW

F: Flexible Thin Film
H10: Inside Helical Pattern
H11: Inside Start End
H12: Inside Tail End
H20: Outside Helical Pattern H21: Outside Start End
H22: Outside Tail End
S1: One-Way Open Slit
S2: Expanded Slot
B10: Heat Dissipating/Radiating Metal Layer
B11: One Side Metal Region
B12: The Other Side Metal Region
V: Via Hole
T10: First Terminal
T11: First Outward Terminal
T12: Via Terminal
T20: Second Terminal
T21: Second Outward Terminal
S3: Other-Way Open Slit
J: Jump Pattern
D: Dummy Heat Dissipating Layer

DETAILED DESCRIPTION

With reference to the drawings, the preferred embodiments of a wireless communication antenna structure for both heat dissipation and radiation of the present disclosure are explained. There may be a plurality of embodiments which can are implemented, characteristics and advantages of the present disclosure may be better understood thereby.

Figure 1:
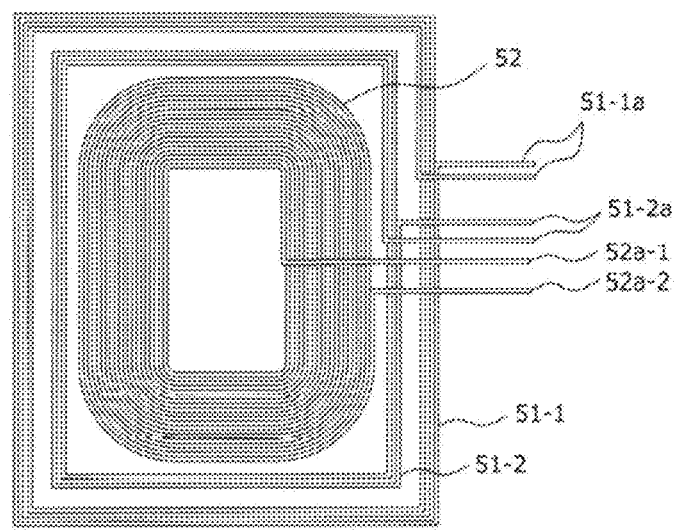
FIG. 1 is a diagram showing an embodiment of antenna coils of a prior art.
Figure 2A:
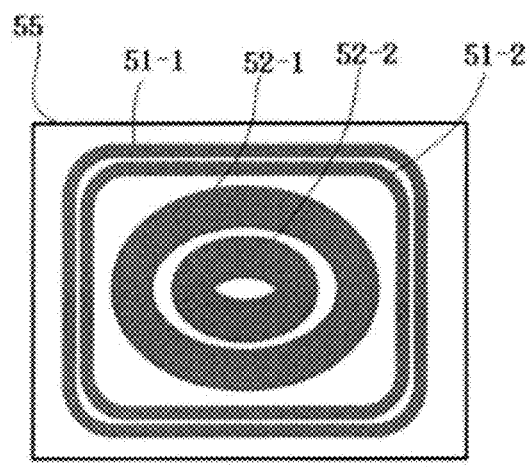
FIGS. 2a-5b are diagrams showing embodiments of methods of configuring multi-antenna coils of the prior art.
Figure 2B:
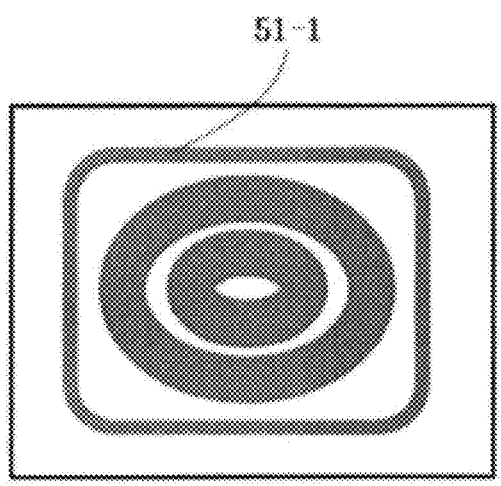
Figure 2C:
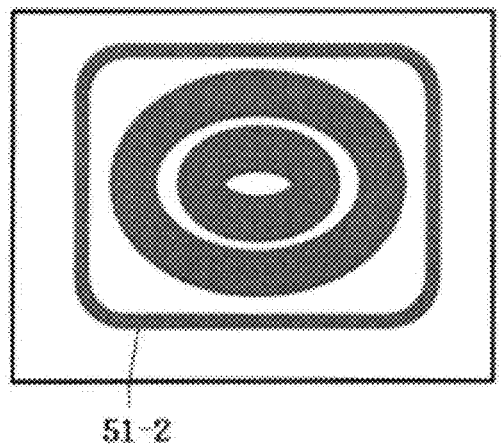
Figure 2D:
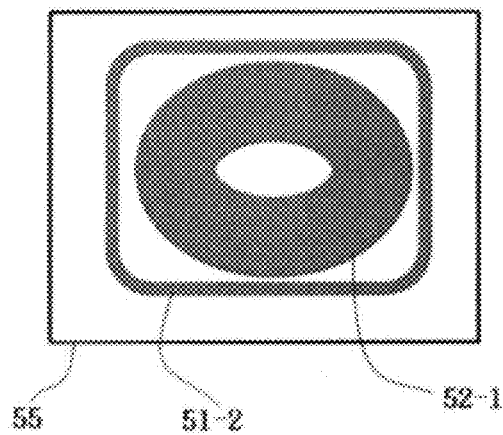
Figure 3A:
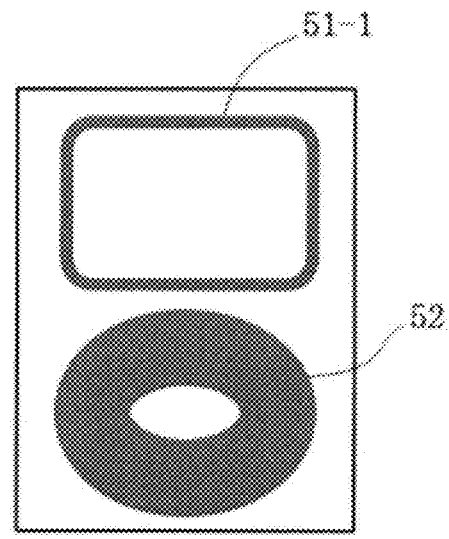
Figure 3B:
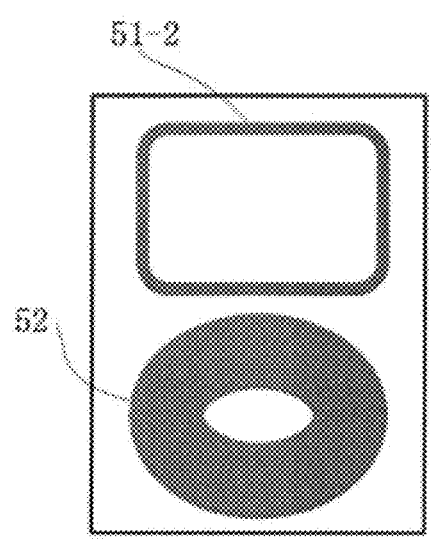
Figure 3C:
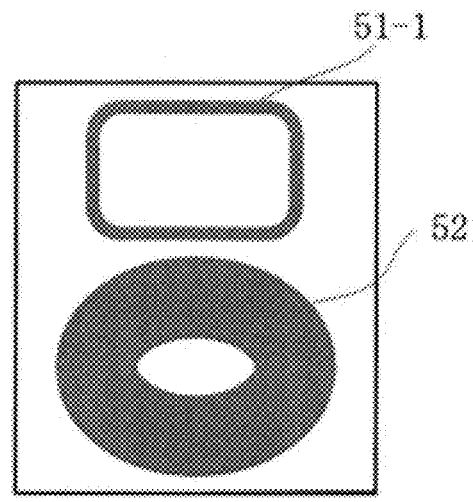
Figure 3D:
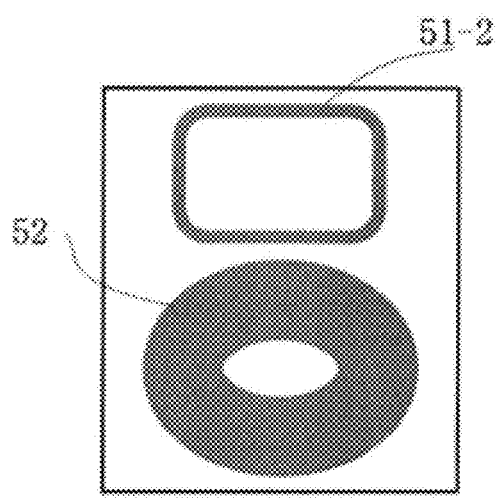
Figure 4A:
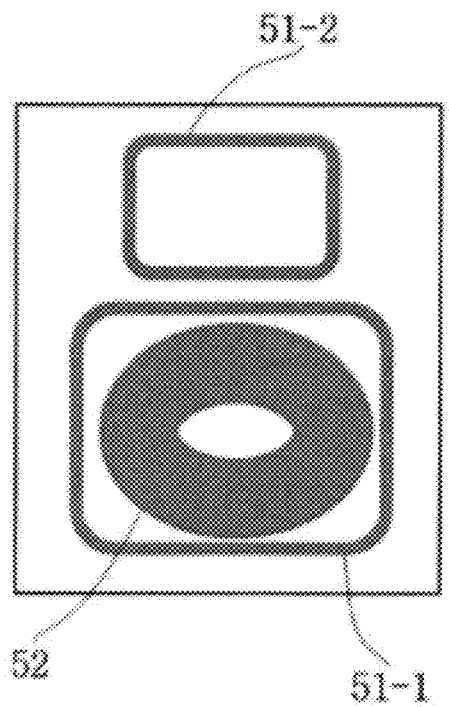
Figure 4B:
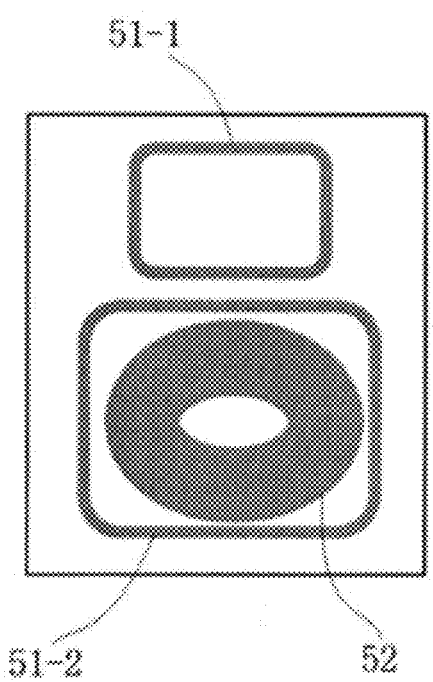
Figure 5A:
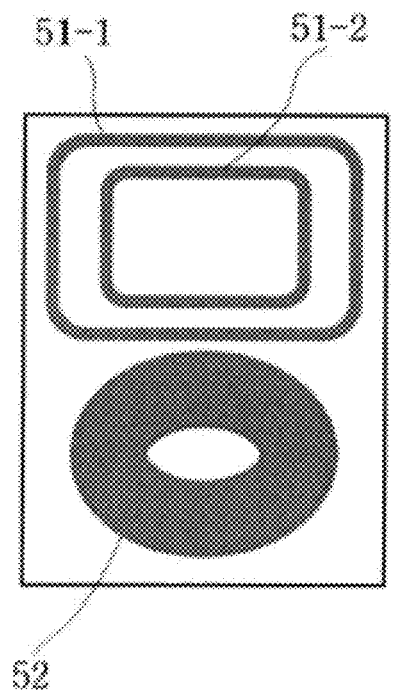
Figure 5B:
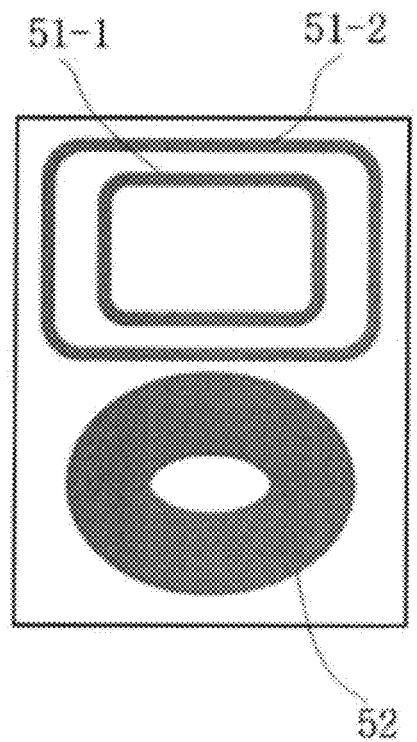
Figure 6:
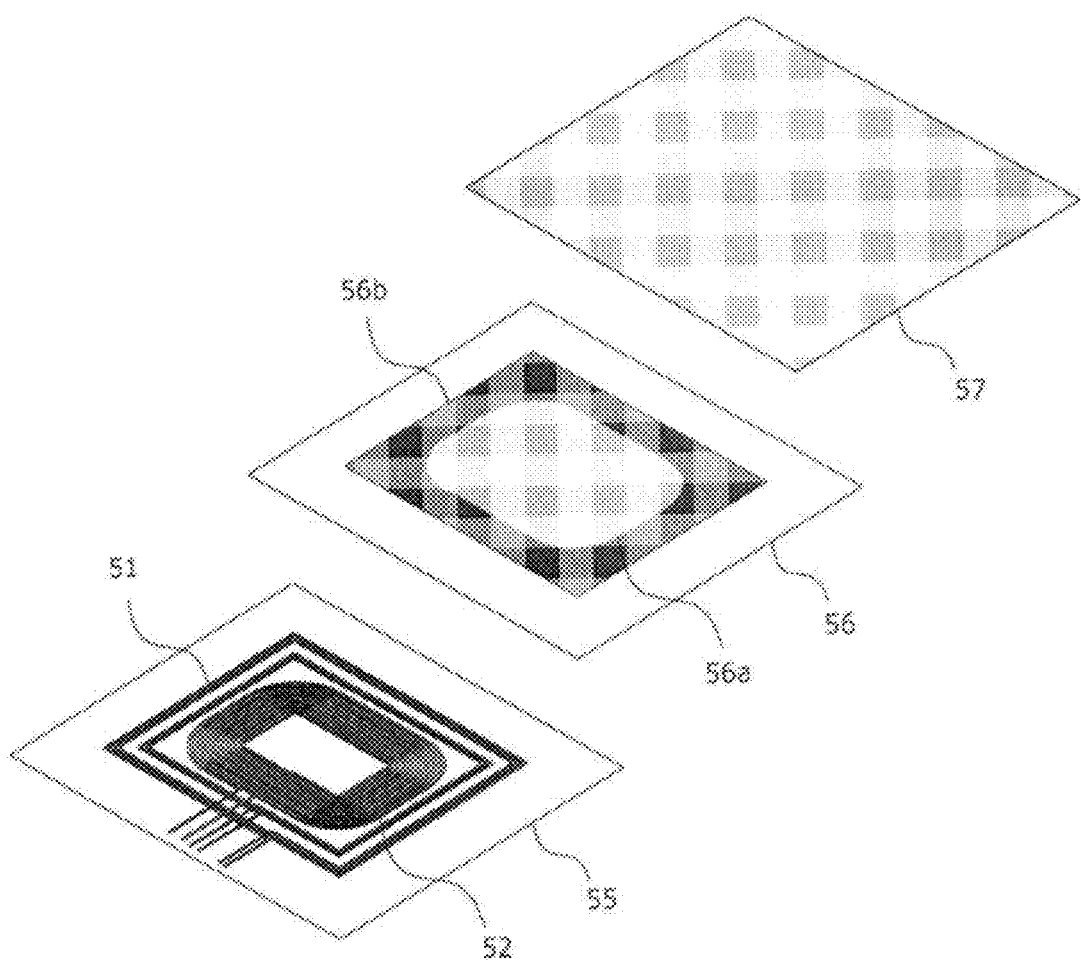
FIG. 6 is a diagram showing an embodiment of other functional film layers provided on wireless antenna coils.
Figure 7A:
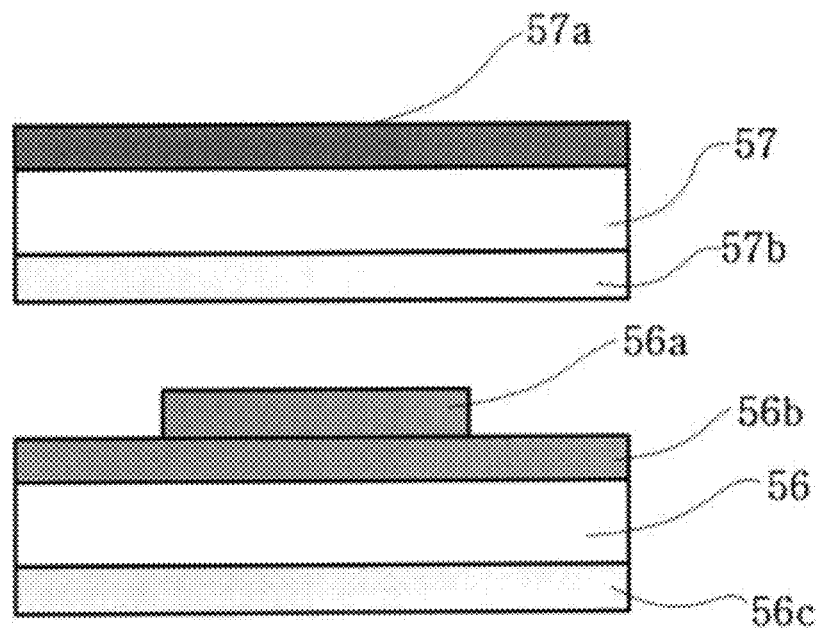
FIGS. 7a and 7b are diagrams showing an embodiment of sectional structures of a ferrite film and a heat dissipating film.
Figure 7B:
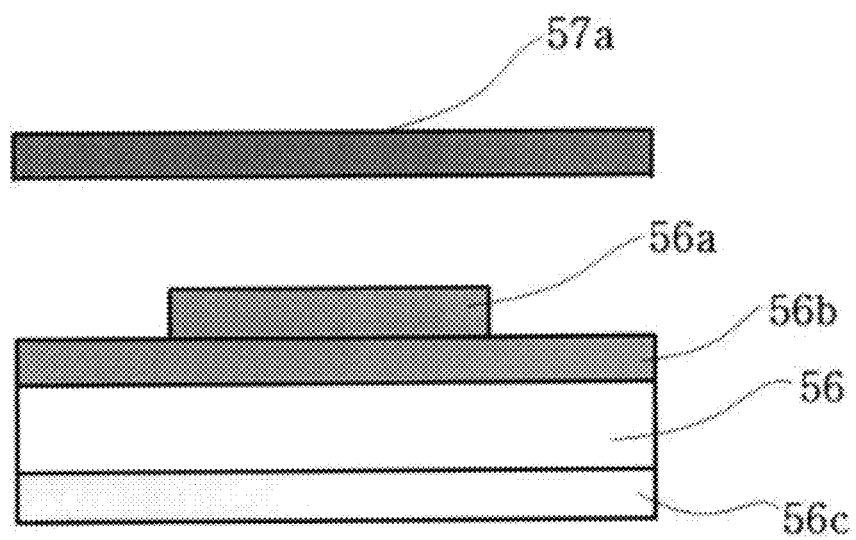
Figure 8A:
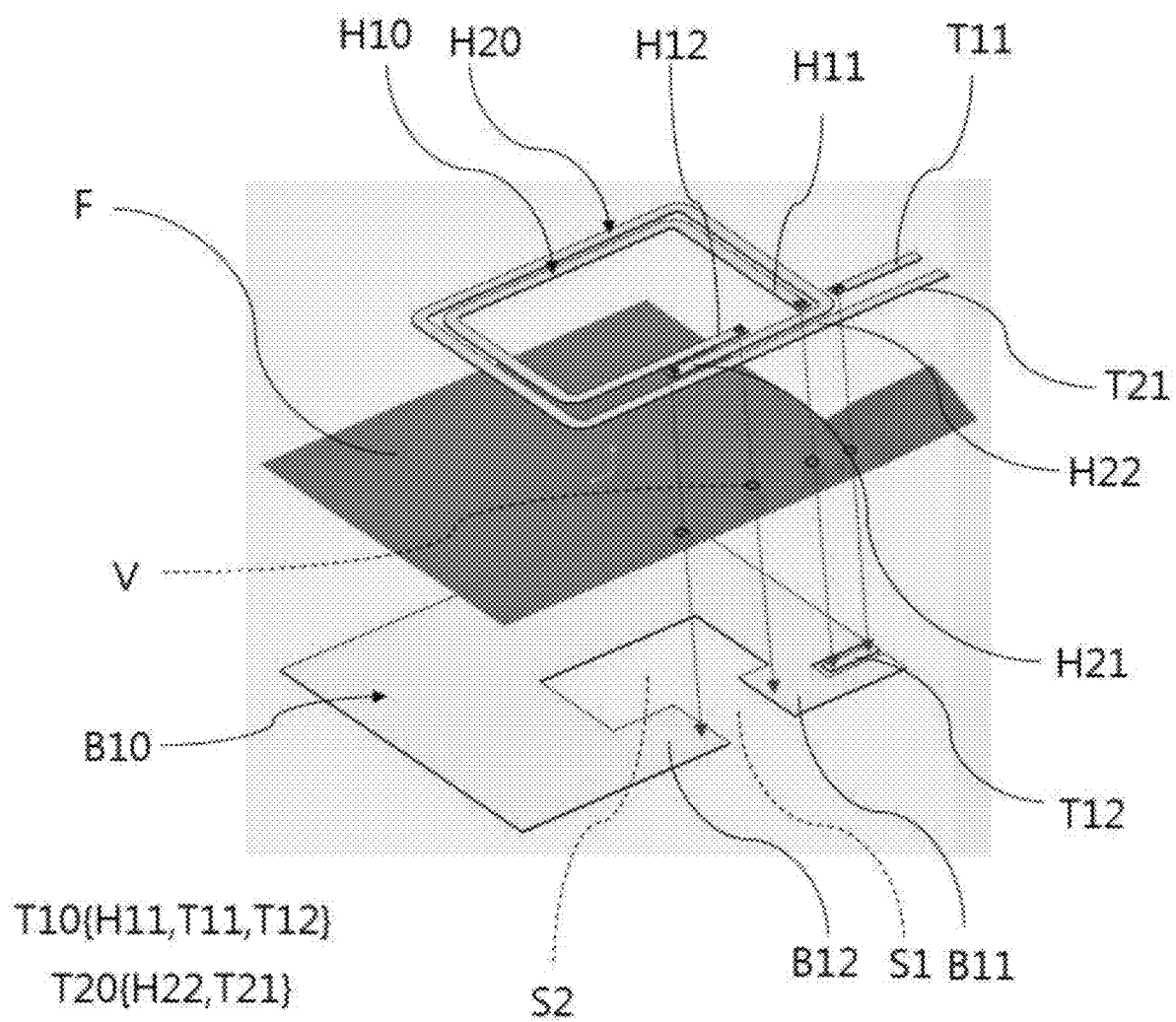
FIG. 8a is a exploded stereoscopic diagram showing a wireless communication antenna structure for both heat dissipation and radiation of the present disclosure.
Figure 8B:
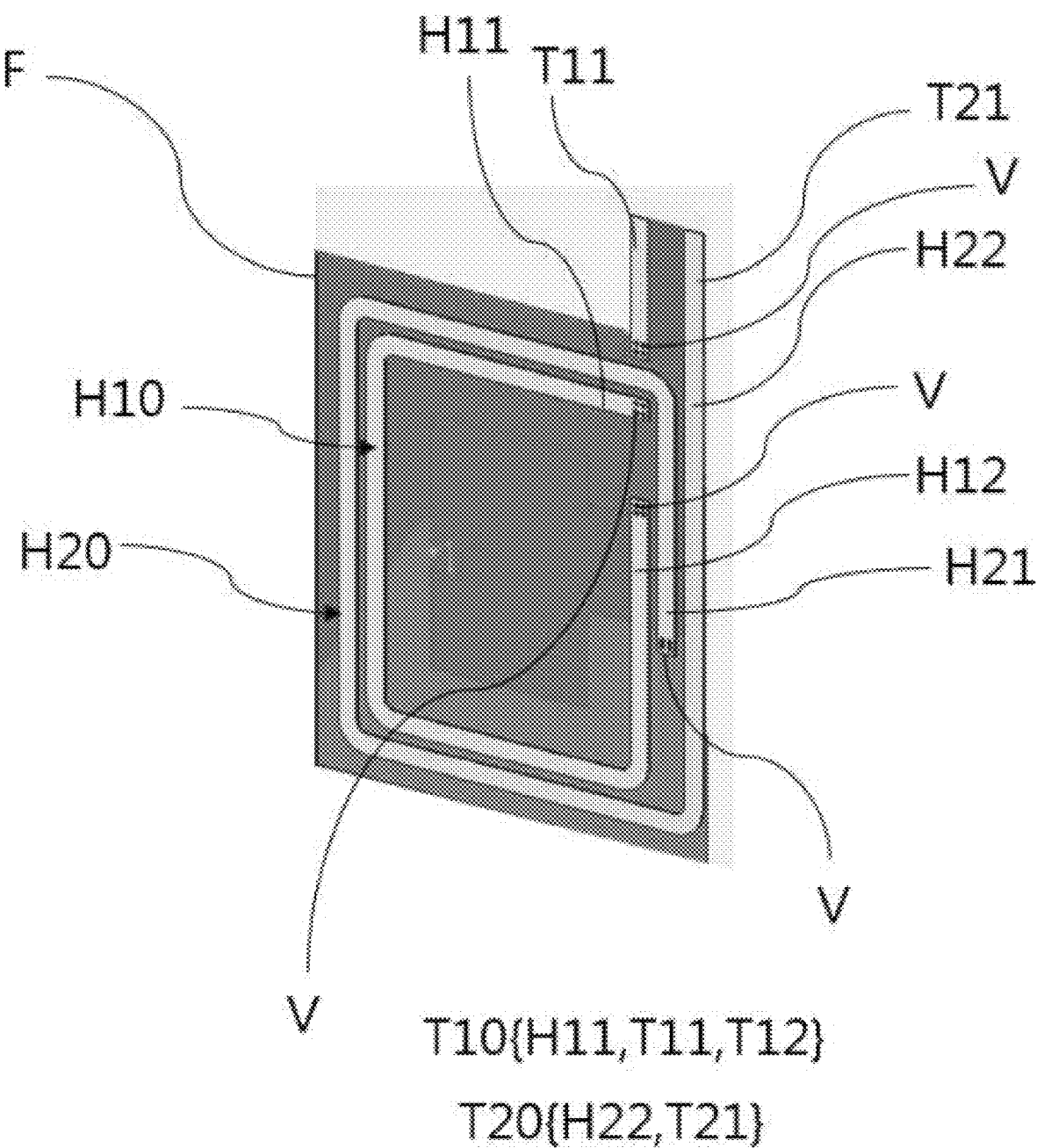
FIG. 8b is a front-direction stereoscopic diagram showing the wireless communication antenna structure for both heat dissipation and radiation of the present disclosure.
Figure 8C:
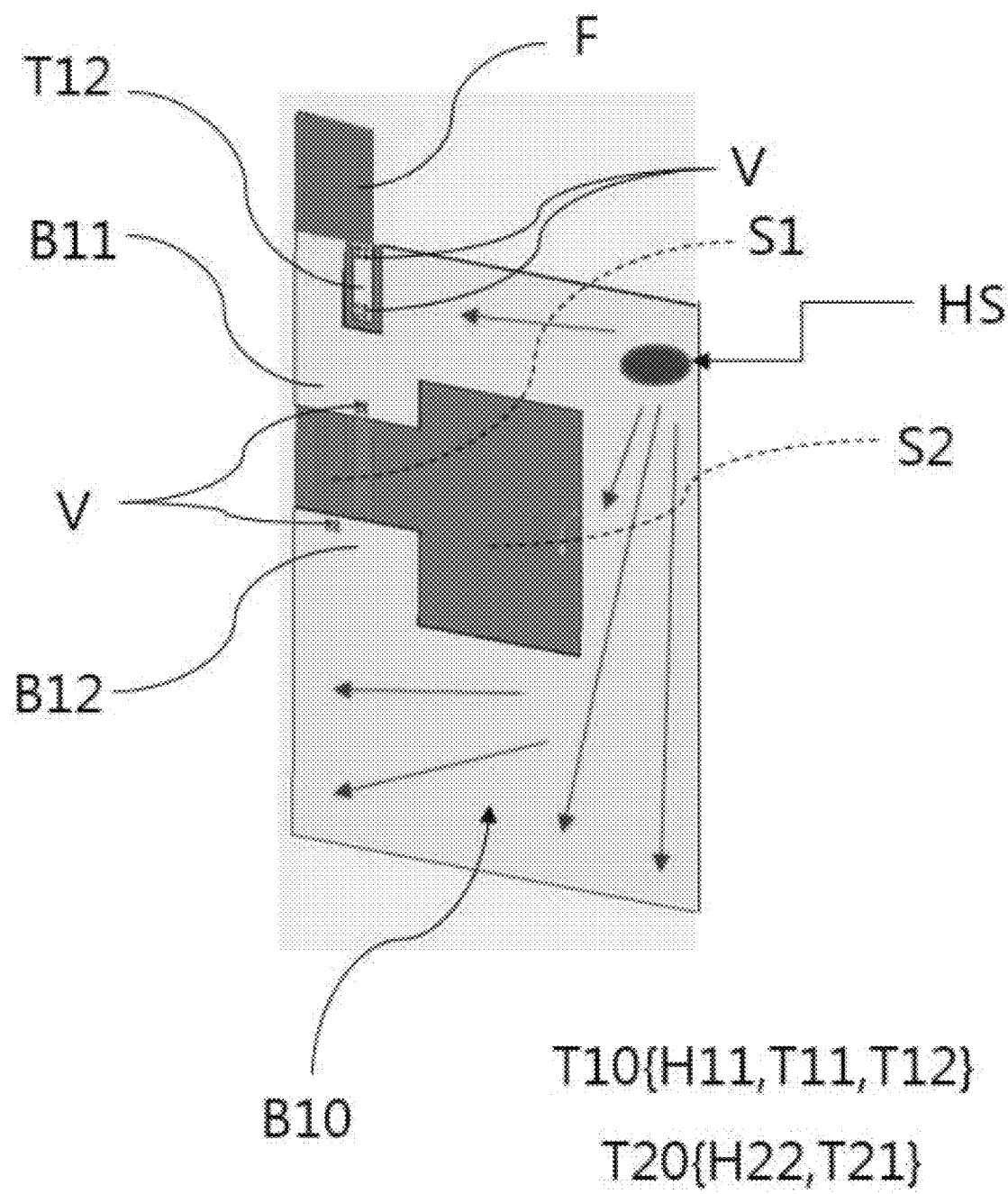
FIG. 8c is a back-direction stereoscopic diagram showing the wireless communication antenna structure for both heat dissipation and radiation of the present disclosure.

FIG. 8a is a exploded stereoscopic diagram showing a wireless communication antenna structure for both heat dissipation and radiation of the present disclosure, FIG. 8b is a front-direction stereoscopic diagram showing the wireless communication antenna structure for both heat dissipation and radiation of the present disclosure, and FIG. 8c is a back-direction stereoscopic diagram showing the wireless communication antenna structure for both heat dissipation and radiation of the present disclosure.

The wireless communication antenna structure for both heat dissipation and radiation of the present disclosure, as illustrated in FIGS. 8a-8c, may include:
an inside helical pattern H10 having an inside start end H11 and an inside tail end H12 formed by performing helical-type patterning (etching, NC (Numerical Control work) processing, or the like) on a metal layer (e.g., a metal layer formed of a copper foil) on one side surface of a flexible film F; an outside helical pattern H20 having an outside start end H21 and an outside tail end H22 formed by performing helical-type patterning on the metal layer on one side surface of the flexible film F at an peripheral of the inside helical pattern H10; a heat dissipating/radiating metal layer B10 having one side metal region B11 and the other side metal region B12 divided based on a one-way open slit S1 formed by performing one-way open patterning on a metal layer on the other side surface of the flexible film F; and a plurality of via holes V respectively connecting, up and down, the inside tail end H12 and the one side metal region B11, and the outside start end H21 and the other side metal region B12, so that the inside helical pattern H10, the heat dissipating/radiating metal layer B10 and the outside helical pattern H20 are connected in sequence to be a helical type. Further, the antenna structure may include an expanded slot S2 formed by expanding the metal layer on the other side surface of the flexible film F and connected with the one-way open slit S1.

The inside helical pattern H10, the heat dissipating/radiating metal layer B10 and the outside helical pattern H20 are connected in sequence to be a helical type to implement wireless communication antennas, for example, NFC, WPT, MST, or the like.

Especially, a helical-type wireless communication antenna that has the inside helical pattern H10 and the outside helical pattern H20 on one side surface of the flexible film F and is wound by means of the additional number of turns of the heat dissipating/radiating metal layer on the other side surface of the flexible film F is implemented, so as to guarantee space utilization while maximizing communication performance in the narrow space of a portable terminal.

Further, the one side metal region B11 and the other side metal region B12 distinguished according to the one-way open slit S1 on the other side surface of the flexible film F, and the inside helical pattern H10 and the outside helical pattern H20 being connected with each other enable the heat dissipating/radiating metal layer B10 to further maximize the near field wireless communication performance while serving as a radiating body. Moreover, the heat dissipating/radiating metal layer B10 may dissipate heat generated by various components inside a portable terminal, even if a heat dissipating film laminated structure coated with a heat dissipating layer in the prior art is not adopted, a light, thin and short entirety of a tablet computer or a smart phone may also be implemented (the heat dissipating/radiating metal layer B10 may adopt one of gold, silver, copper, graphite, Grapheme and carbon with low resistance and good conduction efficiency so as to maximize radiating and heat dissipating effects).

The wireless communication antenna may be, for example, a near field communication (NFC) antenna, a wireless power transfer (WPT) antenna, a magnetic secure transmission (MST) antenna, a mobile settlement service communication antenna, or the like; in particular, as a kind of radio frequency identification (RFID), the NFC uses a non-contact wireless communication module in a frequency band of about 13.56 MHz, the WPT, according to the electromagnetic induction principle, i.e., according to the induced magnetic field principle, forms a magnetic field by enabling a current to flow through a wireless transmitting charging pad, so that it is possible to charge a battery in a low frequency band, i.e., in a frequency band of 100-200 KHz or 6 MHz, by putting a smart phone thereon, and the MST is used for enabling external terminals to transmit data therebetween within a short distance of 10-200 cm using a non-contact magnetic induction bonding force in a frequency band of 13.56 MHz.

For example, the wireless communication antenna reflecting wireless charging of a battery in a portable is mounted, in most cases, near a metal (battery) or near a plurality of electronic components thereon. The metal or electronic components hinder the wireless communication antenna from obtaining an inductance current, i.e., if the wireless communication antenna is mounted near a metal, it causes a large number of phenomena of wireless communication hindering, this is because the metal reduces the inductance of the wireless communication antenna, thus, the Q-factor is reduced, so that there is a change in magnetic induction, and thereby the magnetic field causes the occurring of an eddy current inside the metal. Such an eddy current generates a magnetic field in an opposite direction according to the Len's law, which becomes a big problem in a near field wireless charging system.

For example, if the wireless communication antenna is placed near a surface of a metal (battery), then the performance of the wireless communication antenna is sharply degraded.

This is because a ground plane of the metal just at the bottom of the magnetic field or the electric field greatly reduces intensity of these electromagnetic fields, i.e., intensity of signals. Thus, it hinders the charging efficiency or the NFC function of the wireless communication antenna.

According to the above problem, for the one-way open slit S1 and the expanded slot S2 formed by performing patterning on the metal layer inside the flexible film F applied in the present disclosure, it may guarantee paths of a magnetic field occurring due to currents of a near field transmitter (not shown in the figures) relatively more, so that the wireless communication antenna of a portable terminal is connected omni-directionally to form an induced current, which may, for example, charge a battery more efficiently, or further improve the NFC or MST function to guarantee near field wireless communication quality. Moreover, this function is not limited by a shape of the one-way open slit S1 or the expanded slot S2.

According to such a formation, the wireless communication antenna enables the magnetic field occurring when the current flows through the near field transmitter to be connected with the wireless communication antenna of the portable terminal through the expanded slot S2 and the one-way open slit S1 to be capable of charging a battery while forming the inductance current, or be capable of performing near field wireless communication, such as NFC or MST.

For example, when comparing the insertion loss between the wireless communication antenna having a structure of the expanded slot S2 or the one-way open slit S1 in the heat dissipating/radiating metal layer B10 and a near filed transmitter, and the insertion loss between the wireless communication antenna not having any one of structures of the expanded slot S2 and the one-way open slit S1 in the heat dissipating/radiating metal layer B10 and a near filed transmitter, one will find that when the heat dissipating/radiating metal layer B10 has the expanded slot S2 or the one-way open slit S1, the insertion loss is good (−10 dB), however, when the heat dissipating/radiating metal layer B10 does not have any one of the expanded slot S2 and the one-way open slit S1, the insertion loss is significantly reduced to be −60 to −50 dB, which cannot implement the function as a wireless communication antenna.

As a result, the present disclosure reflects a wireless communication antenna in which an inside helical pattern H10, a heat dissipating/radiating metal layer B10 and an outside helical pattern H20 are connected in sequence to be a helical type by using a metal layer on one side surface and a metal layer on the other side surface of a thin and soft flexible film, that is, a helical-type wireless communication antenna not only has the inside helical pattern H10 and the outside helical pattern H20 of the surface of the flexible film F, but also is wound by means of the additional number of turns of the heat dissipating/radiating metal layer inside the flexible film F, so that the heat dissipating/radiating metal layer may also further maximize the near field wireless communication performance while serving as a radiating body, and also as the heat dissipating/radiating metal layer B10, dissipate heat generated by various components inside the portable terminal, and may implement a light, thin and short portable terminal with high-quality communication and heat dissipation guarantee.

Further, by patterning a metal layer on a surface of the flexible film, a plurality of helical types may be formed, and a plurality of wireless communication antennas such as NFC, WPT, MST and the like may be formed together.

On the other hand, the inside start end H11 of the inside helical pattern H10 is enabled to be used as a first terminal T10, and the outside tail end H22 of the outside helical pattern H20 is enabled to be used as a second terminal T20, so that, for example, a positive power supply may be supplied through the first terminal T10, and a negative power supply may be supplied through the second terminal T20, respectively.

More particularly speaking, the first terminal T10 may include: a first outward terminal T11 formed by performing outward linear patterning on a metal layer on one side surface of the flexible film F; a via terminal T12 formed by performing independent patterning on the heat dissipating/radiating metal layer B10 on the other side surface of the flexible film F; and a plurality of via holes V respectively connecting, up and down, the inside start end H11 and the via terminal T12, and the via terminal T12 and the first outward terminal T11, so that the inside start end H11, the via terminal T12 and the first outward terminal T11 are connected in sequence. In this way, the inside start end H11, the via terminal T12 and the first outward terminal T11 are connected in sequence through the plurality of via holes V, so as to guarantee the number of turns of the inside helical pattern H10.

Further, it is completed by connecting the second terminal T20 to the second outward terminal T21 formed by performing outward linear patterning on the metal layer on the surface of the flexible film F, so that, for example, it may be easier to accept supply of a negative power supply.

Figure 9A:
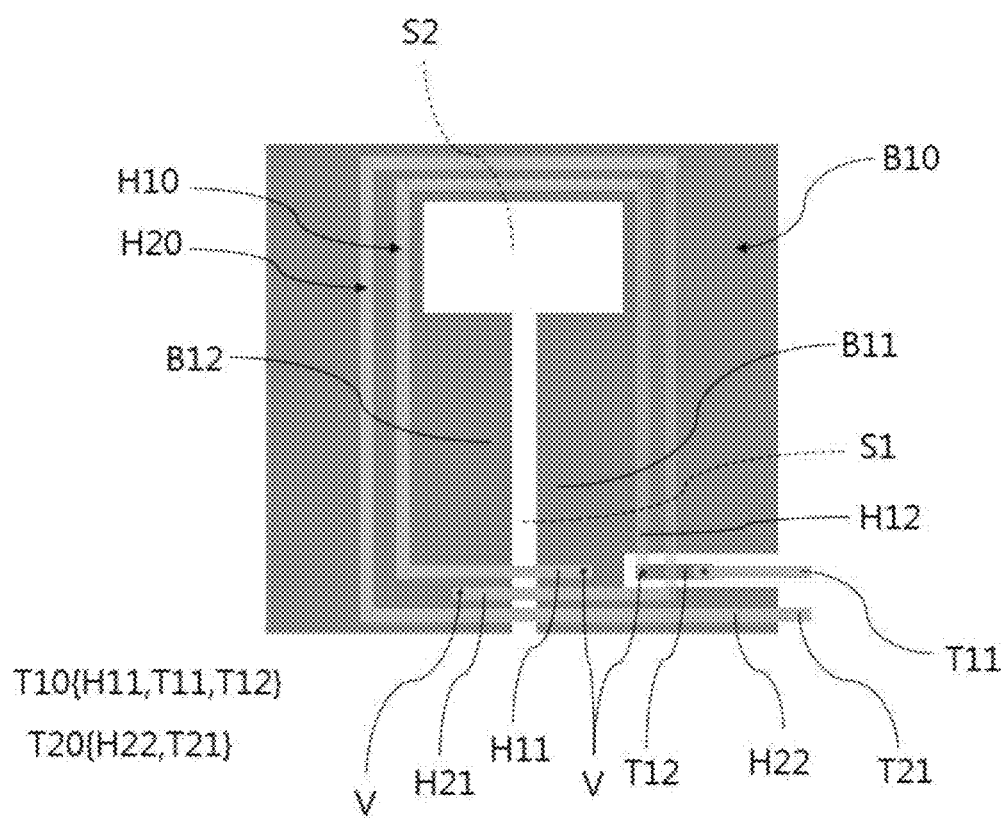
FIG. 9a is a top view showing a state of the wireless communication antenna structure for both heat dissipation and radiation, when a flexible film is removed, of a first embodiment of the present disclosure.
Figure 9B:
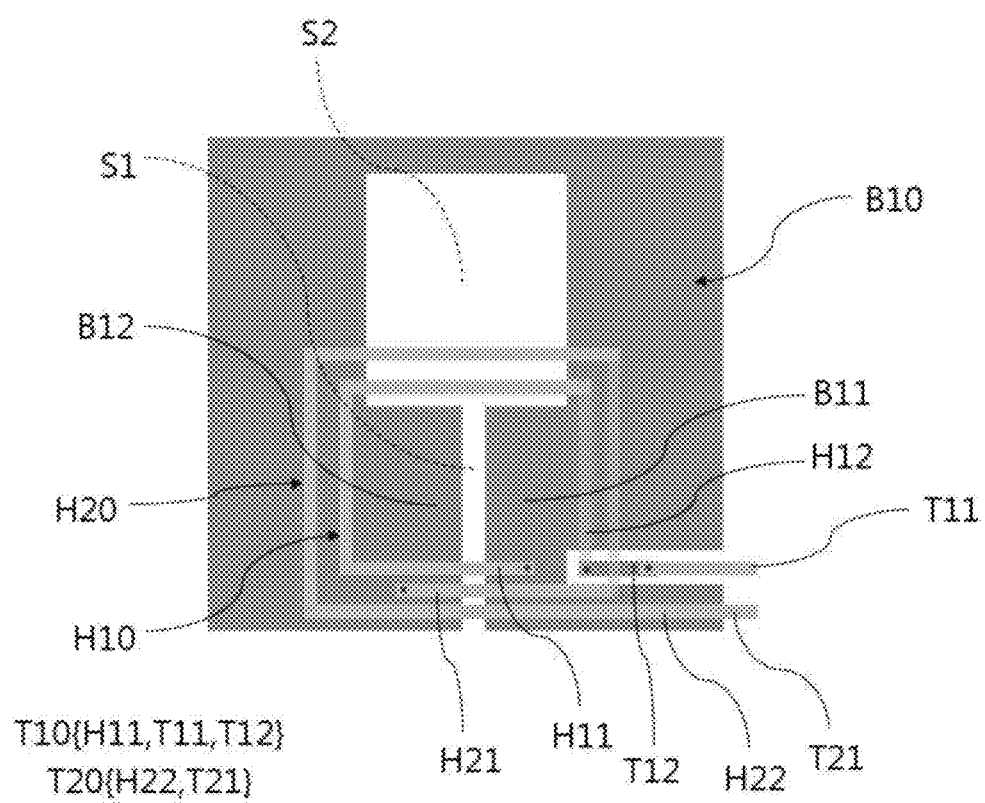
FIG. 9b is a top view showing a state of the wireless communication antenna structure for both heat dissipation and radiation, when the flexible film is removed, of a second embodiment of the present disclosure.
Figure 9C:
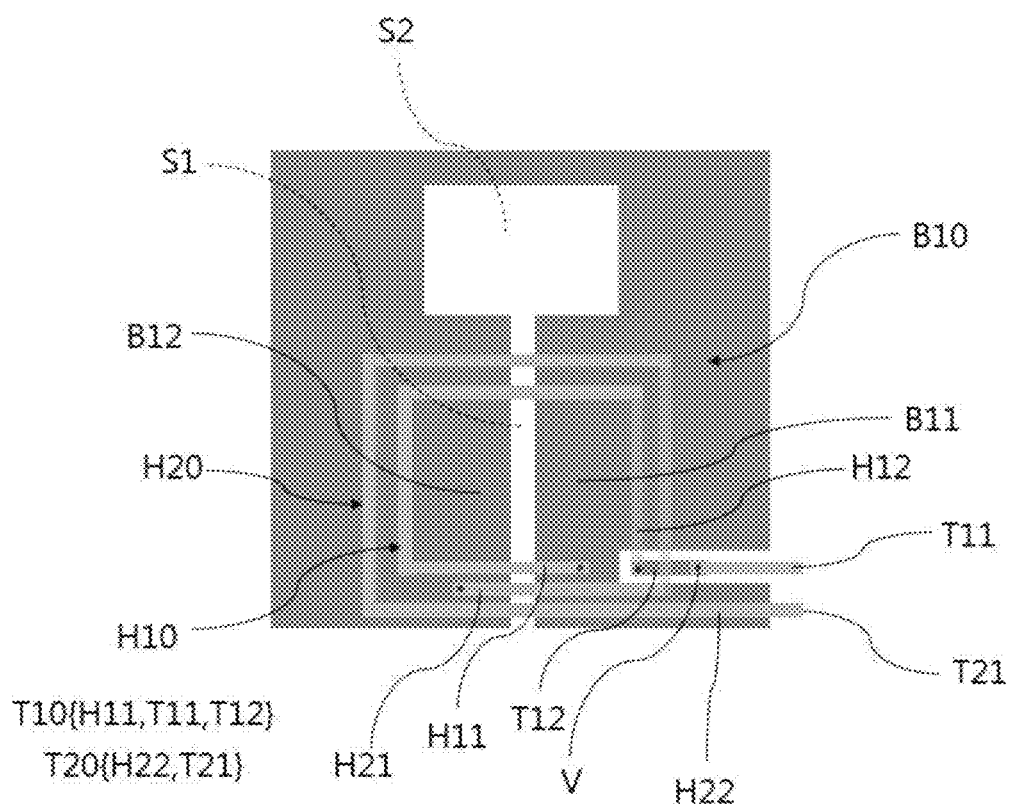
FIG. 9c is a top view showing a state of the wireless communication antenna structure for both heat dissipation and radiation, when the flexible film is removed, of a third embodiment of the present disclosure.

FIG. 9a is a top view showing a state of the wireless communication antenna structure for both heat dissipation and radiation, when a flexible film is removed, of the first embodiment of the present disclosure, FIG. 9b is a top view showing a state of the wireless communication antenna structure for both heat dissipation and radiation, when the flexible film is removed, of the second embodiment of the present disclosure, and FIG. 9c is a top view showing a state of the wireless communication antenna structure for both heat dissipation and radiation, when the flexible film is removed, of the third embodiment of the present disclosure.

The wireless communication antenna for both heat dissipation and radiation of the first embodiment of the present disclosure, as illustrated in FIG. 9a, may enable the inside helical pattern H10 and the outside helical pattern H20 to be formed on one side surface of the flexible film F in a manner of centering on the expanded slot S2 on the other side surface of the flexible film F and being arranged at an peripheral of the expanded slot S2 (most of paths of a magnetic field occurring due to currents of a near field transmitter are guaranteed through the expanded slot S2, so that a wireless communication antenna of a portable terminal is connected omni-directionally to form an induced current).

The wireless communication antenna for both heat dissipation and radiation of the second embodiment of the present disclosure, as illustrated in FIG. 9b, may enable the inside helical pattern H10 and the outside helical pattern H20 to be formed on one side surface of the flexible film F in a manner of being hung on the expanded slot S2 on the other side surface of the flexible film F (through the expanded slot S2 and the one-way open slit S1, it may guarantee paths of a magnetic field occurring due to currents of a near field transmitter, so that a wireless communication antenna of a portable terminal is connected omni-directionally to form an induced current).

The wireless communication antenna for both heat dissipation and radiation of the third embodiment of the present disclosure, as illustrated in FIG. 9c, may surely enable the inside helical pattern H10 and the outside helical pattern H20 to be formed on one side surface of the flexible film F in a manner of being hung on the one-way open slit S1 on the other side surface of the flexible film F (through the expanded slot and the one-way open slit, it may guarantee paths of a magnetic field occurring due to currents of a near field transmitter, so that a wireless communication antenna of a portable terminal is connected omni-directionally to form an induced current).

Figure 10A:
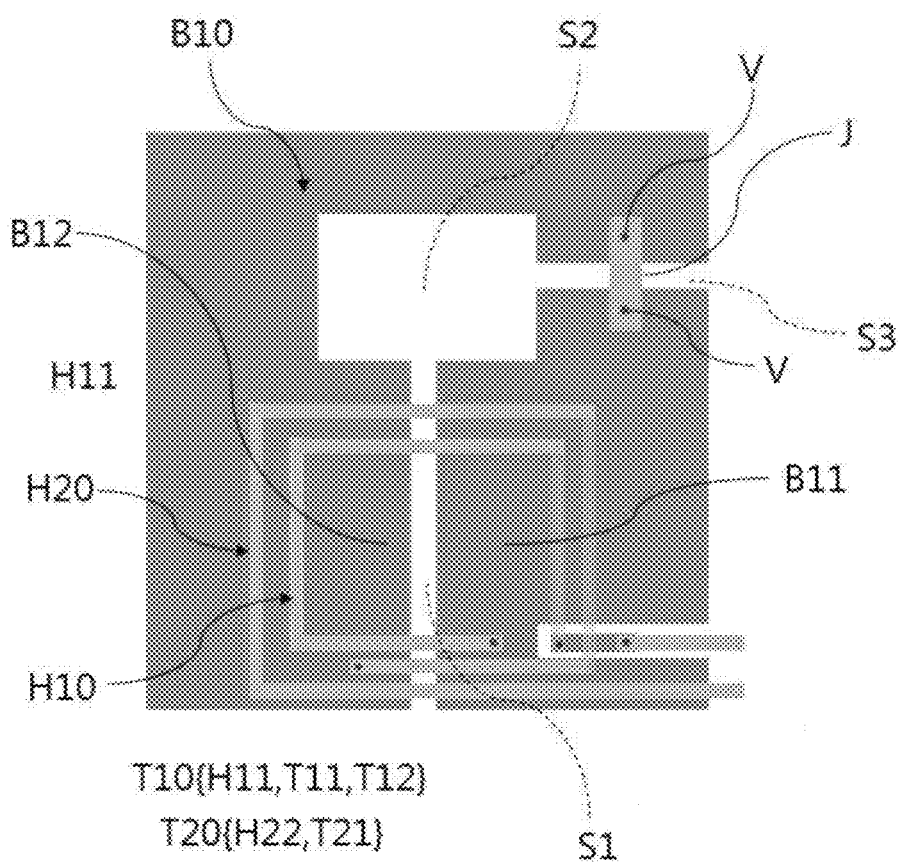
FIGS. 10a and 10b are top views showing a state of the wireless communication antenna structure for both heat dissipation and radiation, when the flexible film is removed, of a fourth embodiment of the present disclosure.
Figure 10B:
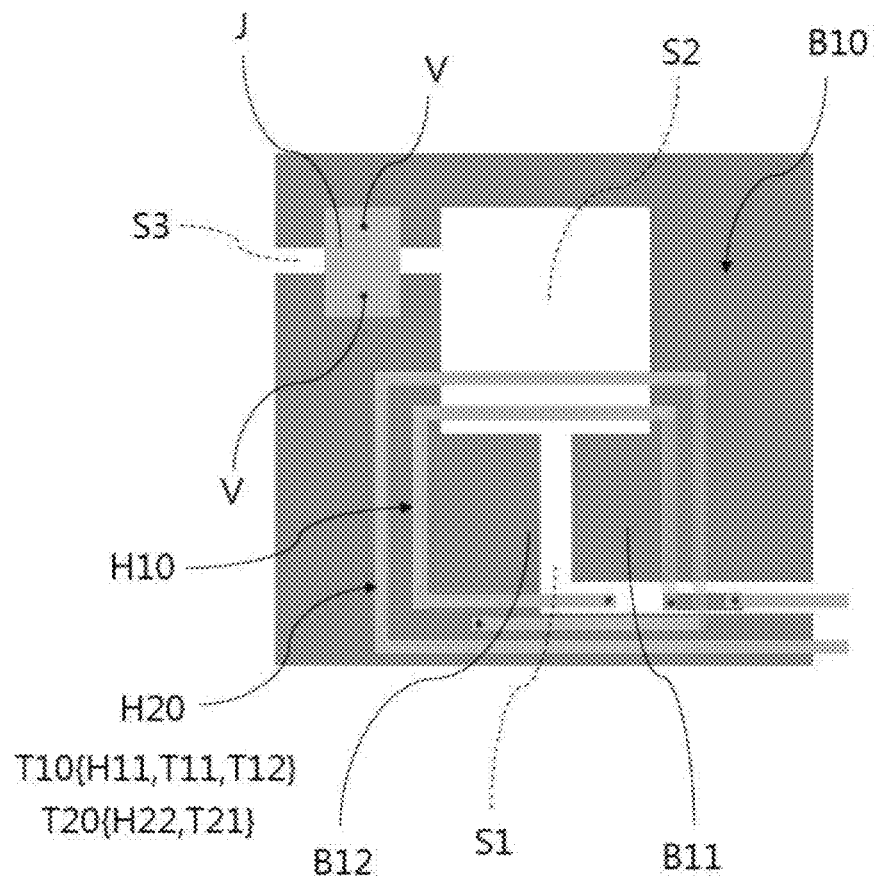

FIGS. 10a and 10b are top views showing a state of the wireless communication antenna structure for both heat dissipation and radiation, when the flexible film is removed, of the fourth embodiment of the present disclosure.

The wireless communication antenna structure for both heat dissipation and radiation of the fourth embodiment of the present disclosure, as illustrated in FIGS. 10a and 10b, may include: an other-way open slit S3 formed in the metal layer on the other side surface of the flexible film F in a manner of being connected with the expanded slot S2; and a jump pattern J formed on a metal layer on one side surface of the flexible film F and connected with the via holes V up and down, so as to be capable of cross the other-way open slit S3 to connect the heat dissipating/radiating metal layer B10 into an entirety.

At this time, while the helical type formed according to the jump pattern J is maintained, the paths of a magnetic field occurring due to currents of a near field transmitter (not shown in the figures) according to the other-way open slit S3 are guaranteed.

Figure 11:
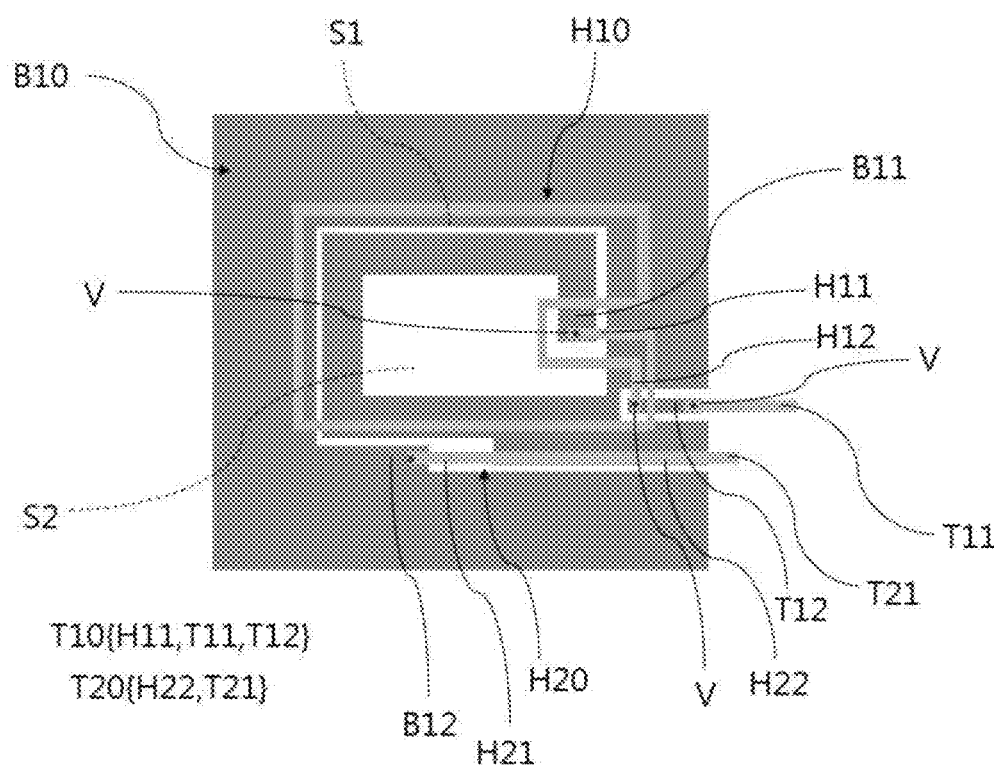
FIG. 11 is a top view showing a state of the wireless communication antenna structure for both heat dissipation and radiation, when the flexible film is removed, of a fifth embodiment of the present disclosure.

FIG. 11 is a top view showing a state of the wireless communication antenna structure for both heat dissipation and radiation, when a flexible film F is removed, of the fifth embodiment of the present disclosure.

The wireless communication antenna for both heat dissipation and radiation of the fifth embodiment of the present disclosure is as illustrated in FIG. 11. The one-way open slit S1 formed on the heat dissipating/radiating metal layer B10 is formed on the metal layer on the other side surface of the flexible film F in a manner of centering on the expanded slot S2 and performing helical-type patterning on the peripheral of the expanded slot S2, so that, by means of such a helical type of the one-way open slit S1, it may further guarantee the overall number of turns of the wireless communication antenna, to further maximize near field wireless communication performance.

Figure 12A:
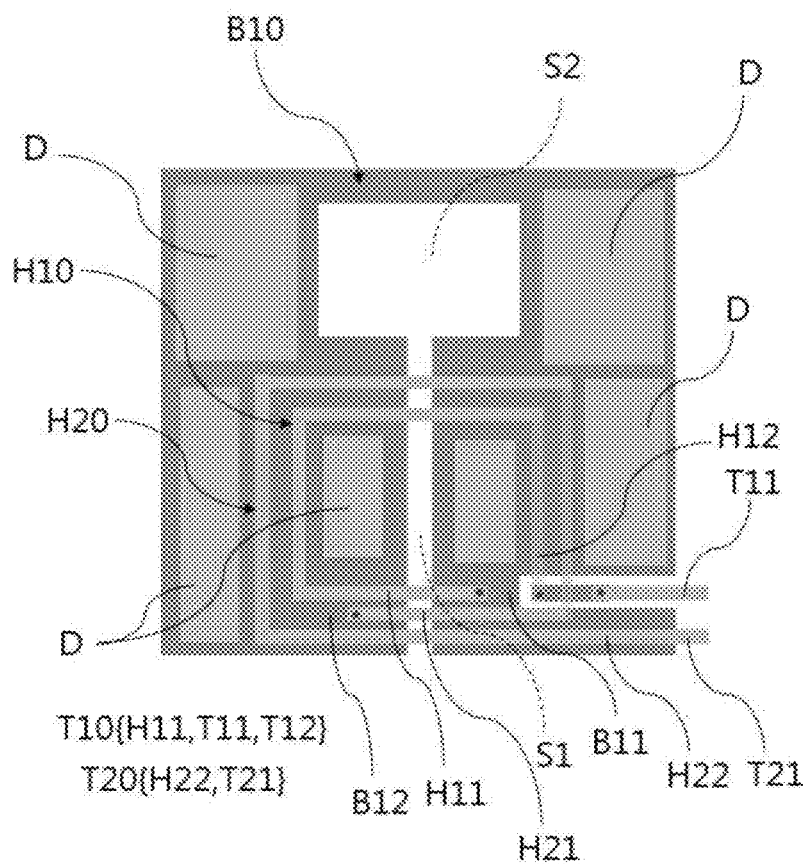
FIGS. 12a and 12b are top views showing a state of the wireless communication antenna structure for both heat dissipation and radiation, when the flexible film is removed, of a sixth embodiment of the present disclosure.
Figure 12B:
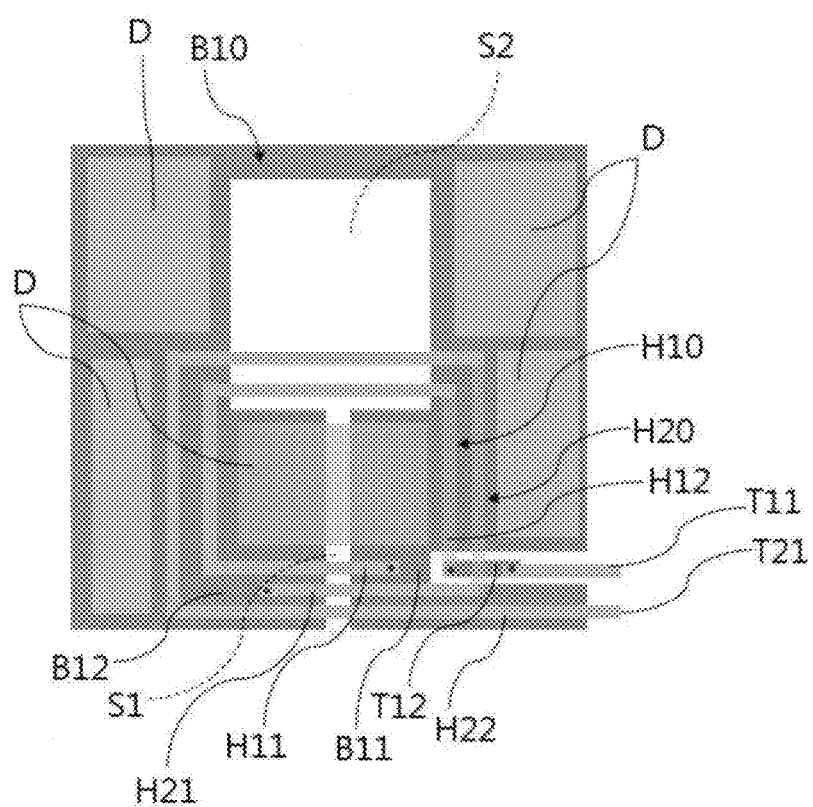

FIGS. 12a and 12b are top views showing a state of the wireless communication antenna structure for both heat dissipation and radiation, when the flexible film F is removed, of the sixth embodiment of the present disclosure.

The wireless communication antenna for both heat dissipation and radiation of the sixth embodiment of the present disclosure further includes a dummy heat dissipating layer D enabling a metal layer on one side surface of the flexible film F inside, outside and surrounding the inside helical pattern H10 and the outside helical pattern H20 to remain to facilitate heat dissipating, and the dummy heat dissipating layer D dissipates heat generated by various components inside a portable terminal to further implement maximization of heat dissipation.

When the metal layer on the surface of the flexible film F is patterned, a portion corresponding to a dead space may be removed through etching and the like or not be formed from the beginning. The present disclosure enables the metal layer on the surface of the flexible film F to remain to play a role as the dummy heat dissipating layer, so as to guarantee maximization of heat dissipation while guaranteeing lightness, thinness and shortness.

What is claimed is:

1. A wireless communication antenna structure for both heat dissipation and radiation, comprising:
   an inside helical pattern having an inside start end and an inside tail end formed by performing helical-type patterning on a metal layer on one side surface of a flexible film;
   an outside helical pattern having an outside start end and an outside tail end formed by performing helical-type patterning on the metal layer on one side surface of the flexible film at an peripheral of the inside helical pattern;
   a heat dissipating/radiating metal layer having one side metal region and the other side metal region divided based on a one-way open slit formed by performing one-way open patterning on a metal layer on the other side surface of the flexible film; and
   a plurality of via holes respectively connecting, up and down, the inside tail end and the one side metal region, and the outside start end and the other side metal region, so that the inside helical pattern, the heat dissipating/radiating metal layer and the outside helical pattern are connected in sequence to be a helical type.

2. The wireless communication antenna structure for both heat dissipation and radiation of claim 1, wherein the inside start end is used as a first terminal, and the outside tail end is used as a second terminal.

3. The wireless communication antenna structure for both heat dissipation and radiation of claim 2, wherein the first terminal comprises:
   a first outward terminal formed by performing outward linear patterning on the metal layer on the one side surface of the flexible film;
   a via terminal formed by performing independent patterning on the heat dissipating/radiating metal layer on the other side surface of the flexible film; and
   a plurality of via holes respectively connecting, up and down, the inside start end and the via terminal, and the via terminal and the first outward terminal, so that the inside start end, the via terminal and the first outward terminal are connected in sequence.

4. The wireless communication antenna structure for both heat dissipation and radiation of claim 2, wherein it is completed by continuously connecting the second terminal to a second outward terminal formed by performing outward linear patterning on the metal layer on the one side surface of the flexible film.

5. The wireless communication antenna structure for both heat dissipation and radiation of claim 1, further comprising an expanded slot formed by expanding the metal layer on the other side surface of the flexible film, and connected with the one-way open slit.

6. The wireless communication antenna structure for both heat dissipation and radiation of claim 5, wherein the inside helical pattern and the outside helical pattern are formed on the one side surface of the flexible film in a manner of centering on the expanded slot on the other side surface of the flexible film and being arranged at an peripheral of the expanded slot.

7. The wireless communication antenna structure for both heat dissipation and radiation of claim 5, wherein the inside helical pattern and the outside helical pattern are formed on one side surface of the flexible film in a manner of being hung on the expanded slot on the other side surface of the flexible film.

8. The wireless communication antenna structure for both heat dissipation and radiation of claim 5, wherein the inside helical pattern and the outside helical pattern are formed on the one side surface of the flexible film in a manner of being hung on the one-way open slit on the other side surface of the flexible film.

9. The wireless communication antenna structure for both heat dissipation and radiation of claim 5, comprising:
   an other-way open slit formed in the metal layer on the other side surface of the flexible film in a manner of being connected with the expanded slot; and
   a jump pattern formed on the metal layer on the one side surface of the flexible film and connected with the via holes up and down, so as to be capable of across the other-way open slit to connect the heat dissipating/radiating metal layer into an entirety.

10. The wireless communication antenna structure for both heat dissipation and radiation of claim 5, wherein the one-way open slit is formed on the metal layer on the other side surface of the flexible film in a manner of centering on the expanded slot and performing helical-type patterning on the peripheral of the expanded slot.

11. The wireless communication antenna structure for both heat dissipation and radiation of claim 5, wherein the antenna structure further comprises a dummy heat dissipating layer for dissipating heat, and the dummy heat dissipating layer is formed by a metal layer remaining on the one side surface of the flexible film inside, outside and surrounding the inside helical pattern and the outside helical pattern.

12. The wireless communication antenna structure for both heat dissipation and radiation of claim 2, further comprising an expanded slot formed by expanding the metal layer on the other side surface of the flexible film, and connected with the one-way open slit.

13. The wireless communication antenna structure for both heat dissipation and radiation of claim 12, wherein the inside helical pattern and the outside helical pattern are formed on the one side surface of the flexible film in a manner of centering on the expanded slot on the other side surface of the flexible film and being arranged at an peripheral of the expanded slot.

14. The wireless communication antenna structure for both heat dissipation and radiation of claim 12, wherein the inside helical pattern and the outside helical pattern are formed on the one side surface of the flexible film in a manner of being hung on the expanded slot on the other side surface of the flexible film.

15. The wireless communication antenna structure for both heat dissipation and radiation of claim 12, wherein the inside helical pattern and the outside helical pattern are formed on the one side surface of the flexible film in a manner of being hung on the one-way open slit on the other side surface of the flexible film.

16. The wireless communication antenna structure for both heat dissipation and radiation of claim 12, comprising:
   an other-way open slit formed in the metal layer on the other side surface of the flexible film in a manner of being connected with the expanded slot; and
   a jump pattern formed on the metal layer on the one side surface of the flexible film and connected with the via holes up and down, so as to be capable of crossing the other-way open slit to connect the heat dissipating/radiating metal layer into an entirety.

17. The wireless communication antenna structure for both heat dissipation and radiation of claim 12, wherein the one-way open slit is formed on the metal layer on the other side surface of the flexible film in a manner of centering on the expanded slot and performing helical-type patterning on the peripheral of the expanded slot.

18. The wireless communication antenna structure for both heat dissipation and radiation of claim 12, wherein the antenna structure further comprises a dummy heat dissipating layer for dissipating heat, and the dummy heat dissipating layer is formed by a metal layer remaining on the one side surface of the flexible film inside, outside and surrounding the inside helical pattern and the outside helical pattern.

* * * * *